(12) United States Patent
Li

(10) Patent No.: US 8,966,072 B2
(45) Date of Patent: Feb. 24, 2015

(54) METHOD AND APPARATUS FOR SUBMITTING DATA

(75) Inventor: Yonghua Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/234,434

(22) PCT Filed: Jun. 29, 2012

(86) PCT No.: PCT/CN2012/077880
§ 371 (c)(1),
(2), (4) Date: Jan. 23, 2014

(87) PCT Pub. No.: WO2013/013556
PCT Pub. Date: Jan. 31, 2013

(65) Prior Publication Data
US 2014/0164614 A1   Jun. 12, 2014

(30) Foreign Application Priority Data

Jul. 26, 2011 (CN) .......................... 2011 1 0210251

(51) Int. Cl.
*G06F 15/173* (2006.01)
*H04L 12/26* (2006.01)
*H04L 29/08* (2006.01)

(52) U.S. Cl.
CPC ................ *H04L 43/08* (2013.01); *H04L 67/30* (2013.01); *H04L 67/22* (2013.01)
USPC ........................................................ 709/224

(58) Field of Classification Search
None
See application file for complete search history.

(56) References Cited

U.S. PATENT DOCUMENTS

| | | | |
|---|---|---|---|
| 8,433,750 B1 * | 4/2013 | Carlson et al. ................. | 709/203 |
| 2002/0032772 A1 | 3/2002 | Olstad et al. | |
| 2004/0111507 A1 * | 6/2004 | Villado et al. ................. | 709/224 |
| 2006/0002331 A1 * | 1/2006 | Bhagwat et al. ............... | 370/328 |
| 2007/0061451 A1 * | 3/2007 | Villado et al. ................. | 709/224 |
| 2007/0258382 A1 * | 11/2007 | Foll et al. ....................... | 370/252 |
| 2011/0035505 A1 * | 2/2011 | Jakobsson ...................... | 709/229 |

FOREIGN PATENT DOCUMENTS

| | | |
|---|---|---|
| CN | 101079768 A | 11/2007 |
| CN | 101236562 A | 8/2008 |

OTHER PUBLICATIONS

International Search Report for PCT/CN2012/077880 dated Oct. 18, 2012.

* cited by examiner

*Primary Examiner* — Brian P Whipple
(74) *Attorney, Agent, or Firm* — Marshall, Gerstein & Borun LLP

(57) ABSTRACT

Various examples provide a method and an apparatus for submitting data. The method includes: a user terminal sends a webpage visiting request to a server, scans received webpage information returned by the server in response to the webpage visiting request, adds a mark pointing to a statistic server into the webpage information; parses the webpage information, and sends user visiting data to the statistic server by using the mark.

11 Claims, 4 Drawing Sheets

METHOD AND APPARATUS FOR SUBMITTING DATA

The present disclosure claims priority of Chinese patent application No. 201110210251.9 titled "method and apparatus for submitting data" and filed on Jul. 26, 2011 with the Patent Office of the People's Republic of China, the disclosure of which is incorporated by reference in its entirety.

TECHNICAL FIELD

The present disclosure relates to the Internet technology, and particularly, to a method and an apparatus for submitting data.

BACKGROUND

A click stream is the trace left by continuous visits from a visitor. The analysis of click streams has outvalued the analysis of other types of data by various websites. In-depth analysis of the data has become an effective tool of websites for getting knowledge of business conditions and user behaviors.

SUMMARY

Various embodiments provide a method and an apparatus for submitting data to submit behaviors of users visiting a website in real time for the website to analyze.

Various examples of the present disclosure provide the following mechanisms.

A method for submitting data may include:
sending, by a user terminal, a webpage visiting request to a server;
scanning, by the user terminal, webpage information returned by the server in response to the webpage visiting request, adding a mark pointing to a statistic server in the webpage information;
parsing, by the user terminal, the webpage information, and sending user visiting data to the statistic server by using the mark.

A user terminal may include:
a sending module, configured to send a webpage visiting request to a server;
a receiving module, configured to receive webpage information returned by the server in response to the webpage visiting request;
a data processing module, configured to scan the webpage information received by the receiving module, and add a mark pointing to a statistic server in the webpage information; and
a parsing module, configured to parse the webpage information, and send user visiting data to the statistic server based on the mark.

A method for submitting data may include:
receiving, by a proxy server, a webpage visiting request sent by a user terminal;
forwarding, by the proxy server, the webpage visiting request to a server, receiving webpage information returned by the server in response to the webpage visiting request;
scanning, by the proxy server, the webpage information received, and adding a mark pointing to a statistic server into the webpage information;
sending, by the proxy server, the webpage information to the user terminal which parses the webpage information and sends user visiting data to the statistic server by using the mark.

A proxy server may include:
a first receiving module, configured to receive a webpage visiting request sent by a user terminal;
a first sending module, configured to forward the webpage visiting request received by the first receiving module to a server;
a second receiving module, configured to receive webpage information returned by the server in response to the webpage visiting request;
a data processing module, configured to scan the webpage information received by the second receiving module, and add a mark which points to a statistic server into the webpage information; and
a second sending module, configured to send the webpage information to the user terminal which parses the webpage information and sends user visiting data to the statistic server by using the mark.

Compared with the prior art, embodiments of the present disclosure have merits as follows.

When visiting a webpage, a user terminal or a proxy server adds a mark pointing to a statistic server into webpage information received. When the user terminal parses the processed webpage information, user visiting data is automatically sent to the statistic server by using the mark. Thus, the user terminal is able to submit current behaviors of the user visiting the webpage to the statistic server in real time.

BRIEF DESCRIPTION OF THE DRAWINGS

In order to make the technical scheme of embodiments of the present invention more clearly, the following is a brief introduction of the drawings used in description of the embodiments. Obviously, the following drawings are merely some of the embodiments, and based on which other drawings can be obtained by those skilled in the art without doing any inventive work.

DETAILED DESCRIPTIONS

Figure 1:
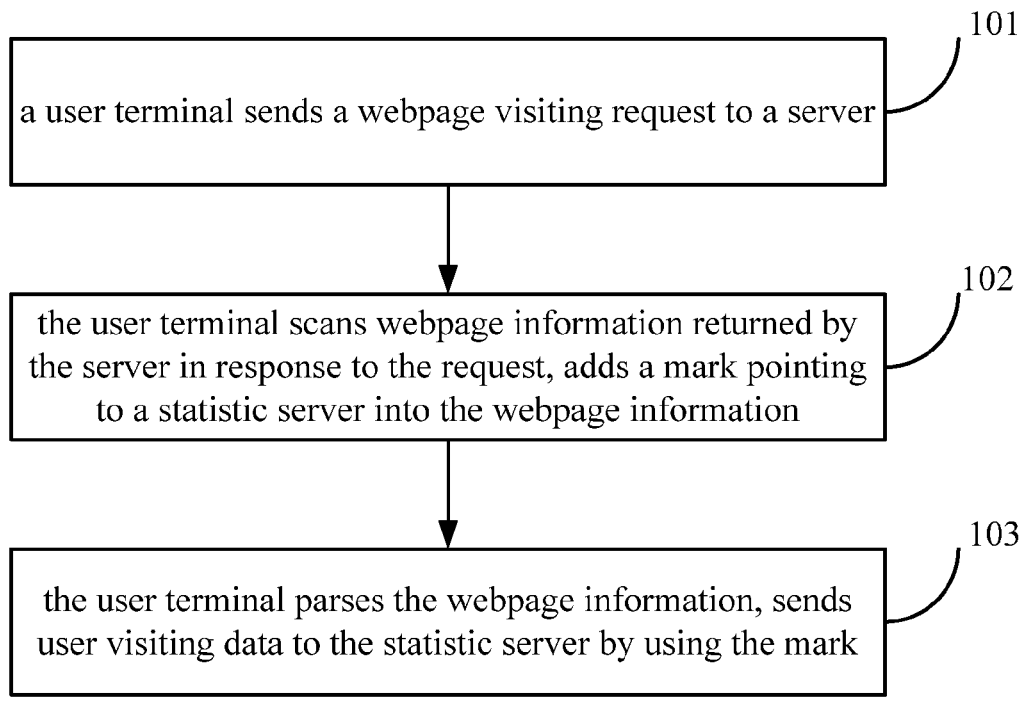
FIG. 1 is a flowchart illustrating a method according to an example of the present disclosure.

An example of a method provided by an embodiment is as shown in FIG. 1.

Referring to FIG. 1, FIG. 1 is a flowchart illustrating a method according to an example of the present disclosure. As shown in FIG. 1, the process may include the following procedures.

In block 101, a user terminal sends a webpage visiting request to a server.

In block 102, the user terminal scans webpage information returned by the server in response to the webpage visiting request, and adds a mark pointing to a statistic server in the webpage information.

Generally, after receiving a webpage visiting request, the server may search for the webpage information corresponding to webpage address information in the webpage visiting request, and return the webpage information to the user terminal. After receiving the webpage information returned by the server, the user terminal may scan the webpage information and add a mark pointing to the statistic server into the webpage information.

In an example, the webpage information may include webpage source codes of text information in the webpage and address information of a flash and/or an image in the webpage. Therefore, in block 102, the method of adding a mark pointing to the statistic server into the webpage information may include: adding a mark pointing to the statistic server at a pre-defined position in the webpage source codes of the webpage information.

The mark may be a code segment which includes address information of the statistic server.

In block 103, the user terminal parses the webpage information, and sends user visiting data to the statistic server by using the mark.

As such, a user's visit to a webpage is submitted to the statistic server to enable the statistic server to perform in-depth analysis of the user's visit to the webpage.

In an example, the user terminal may be a mobile phone. Thus, according to the process as shown in FIG. 1, a mobile phone visits a webpage (e.g., by using a QQ browser for mobile phone), and submits information of the mobile phone (identity information of the phone, address information of the phone, user agent, and the like) and information of the webpage being visited (e.g., the address of the webpage) to the statistic server which then performs statistics and analysis based on the information received.

But the user terminal in various embodiments is not necessarily a mobile phone, and may be a personal computer (PC) or other types of user terminals.

The following takes a mobile phone as an example of the user terminal and describes several examples in detail with reference to the accompanying drawings to make the technical mechanism more fully and clearly understood. It should be understood that the examples described are merely some examples, not all of the examples. Based on the examples of the present disclosure, other examples obtained by those skilled in the art without any inventive work done are still within the protection scope of the present disclosure.

Figure 2A:
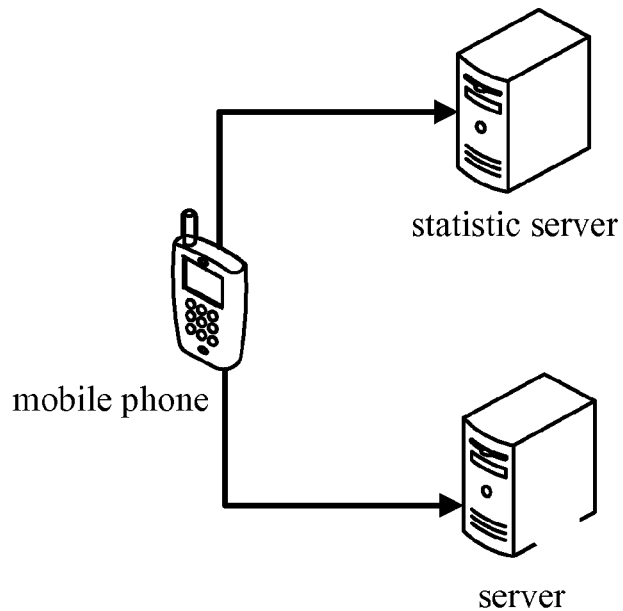
FIG. 2a is a schematic diagram illustrating a structure of a system which carries out the method for submitting data according to an example of the present disclosure.
Figure 2B:
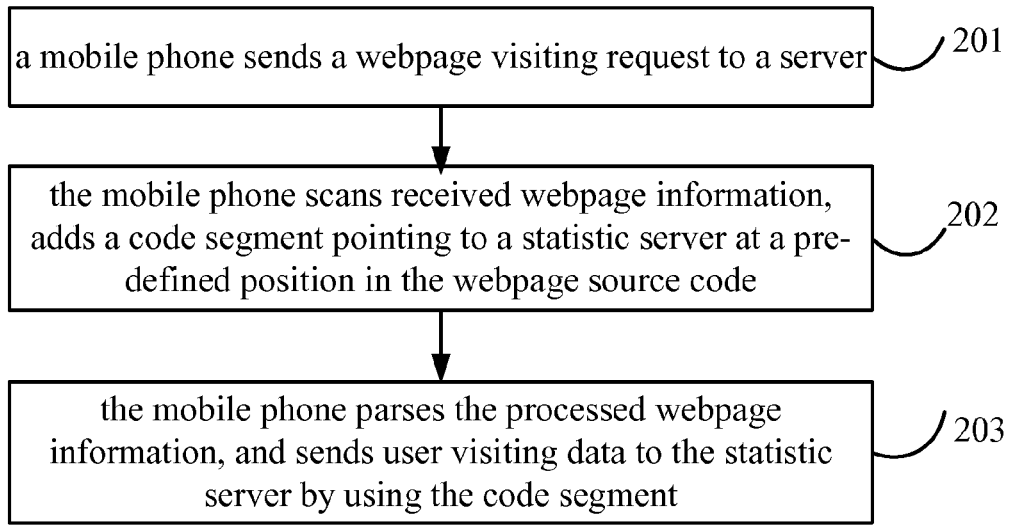
FIG. 2b is a flowchart illustrating a method for submitting data according to an example of the present disclosure.

The technical scheme of an example is applicable to the system as shown in FIG. 2a. In this example, a browser in a mobile phone can directly visit a webpage. FIG. 2b is a flowchart illustrating a method for submitting data according to an example of the present disclosure. The method may include the following procedures.

In block 201, a user terminal sends a webpage visiting request to a server.

In an example, the mobile phone may send the webpage visiting request by inputting the address of the webpage to be visited into an address bar presented by a browser in the phone. The webpage visiting request may include at least identity information, IP address information of the mobile phone that initiated the request and address information of the webpage the mobile phone requests to visit. The identity information of the mobile phone is a unique identification of the mobile phone, which may be an International Mobile Equipment Identification Number (IMEI). The server may be a WEB/WAP (Wireless Application Protocol) server, or another server providing Internet services. In this example, the server is a WEB/WAP server. In block 202, the mobile phone scans webpage information received, and adds a code segment pointing to a statistic server at a pre-defined position in source codes of the webpage.

In an example, the server, e.g., the WEB/WAP server, may search for the webpage information by using webpage address information in the webpage visiting request after receiving the request, and sends the webpage information to the mobile phone. The webpage information may include source codes of text information in the webpage and address information of a flash and/or an image in the webpage in the webpage.

When receiving the webpage information sent by the server, the mobile phone may scan the source codes of the webpage and add a code segment pointing to a statistic server, e.g., <img src="http://111.11.1.1/tongji.gif" alt="."/>, at a pre-defined position, e.g., the end or the beginning of the source codes.

In block 203, the mobile phone parses the processed webpage information, and sends user visiting data to the statistic server according to the code segment.

In an example, the code sement may be a code segment describing a resource file, and the method of sending the user visiting data to the statistic server according to the code segment in block 203 may include:

the mobile phone sending a request for the resource file to the statistic server by using address information of the statistic server in the code segment so that the statistic server obtains user visiting data in the resource file request; and the statistic server may return a resource file response in which the resource file is null to the mobile phone in response to the resource file request.

After receiving the resource file response in which the resource file is null, the mobile phone may directly discard the resource file or perform no processing.

In an example, the code sement may be a code segment describing an image or another type of resource file, e.g., a Cascading Style Sheet (CSS), a javascript (js) and the like, and this is not limited in the present disclosure.

Taking an image code segment as an example of the code segment, in block 203, when the mobile phone parses the image code segment pointing to the statistic server in the webpage, the mobile phone may automatically send an image download request to the statistic server according to address information in the image code segment. The image download request may include user visiting information, such as information of the mobile phone that sends the image download request (e.g., the identity information and IP address information of the mobile phone, user agent and the like) and information of the webpage visited by the user (e.g., webpage address) and so on. In response to the image download request sent by the mobile phone, the statistic server may return an image whose width and height are 0 to the mobile phone (after receiving an image, the mobile phone may direct discard the image when the width and height of the image are 0; since the width and height of the image are 0, the image occupies little memory space in the mobile phone, thus does not affect display of other images; therefore, the mobile phone may perform no processing on an image whose width and height are 0). The statistic server obtains the user visiting information in the image download request, e.g., the identity information and IP address information of the mobile phone, user agent, and webpage address visited by the user and the like, and performs statistics and analysis by using the user visiting data. The information of the mobile phone in the user visiting data may include one or two of the identity information of the mobile phone, the address information of the mobile phone, the User-Agent, and the webpage information in the user visiting data may be other information which identifies the webpage being visited by the mobile phone instead of the address information of the webpage.

According to the technical scheme, a mobile phone may report webpage visiting behaviors of the user to the statistic server in real time when browsing webpages, thus enables the statistic server to perform statistics and analysis based on the user visiting data obtained.

In an example, a mobile phone may store information of a specific visiting object in advance, and add a code segment pointing to the statistic server at a pre-defined position, e.g., the end or the beginning, in the webpage source codes only when the object being visited is the specific visiting object pre-stored. This can reduce the system workload and provide more targeted statistics and analysis. For example, a mobile phone may store the address of a specific webpage or a domain name of a server of a website, e.g., sina, sohu and etc. When the mobile phone visits a webpage, a code segment pointing to the statistic server is added at a pre-defined position in webpage source codes in response to a determination that the webpage being visited is a webpage of sina or sohu; and in other cases, the mobile phone merely parses the webpage received and displays the webpage. Taking a code segment describing an image as an example of the code segment, when the mobile phone sends a request for visiting a webpage of the website sina to a WEB/WAP server, the mobile phone scans the source codes of the webpage after receiving the webpage returned by the WEB/WAP server, and adds a code segment describing an image pointing to the statistic server at a pre-defined position, e.g., the end, in the webpage source codes. When parsing the code segment, the mobile phone sends an image download request to the statistic server which obtains information such as the identity information and IP address information of the mobile phone, the User-Agent and webpage address, from the image download request and performs statistics and analysis based on the information obtained. The information of the specific visiting object may be configured in the mobile phone by default when the mobile phone is manufactured, or may be sent to the mobile phone by a configuration server when the mobile phone runs a browser.

According to the technical scheme, the mobile phone may selectively report behaviors of visiting target webpages to the statistic server according to a policy configured when visiting a webpage to make the statistic server perform statistics and analysis, thus reduces workload of the system and makes the statistics and analysis more targeted.

Figure 3:
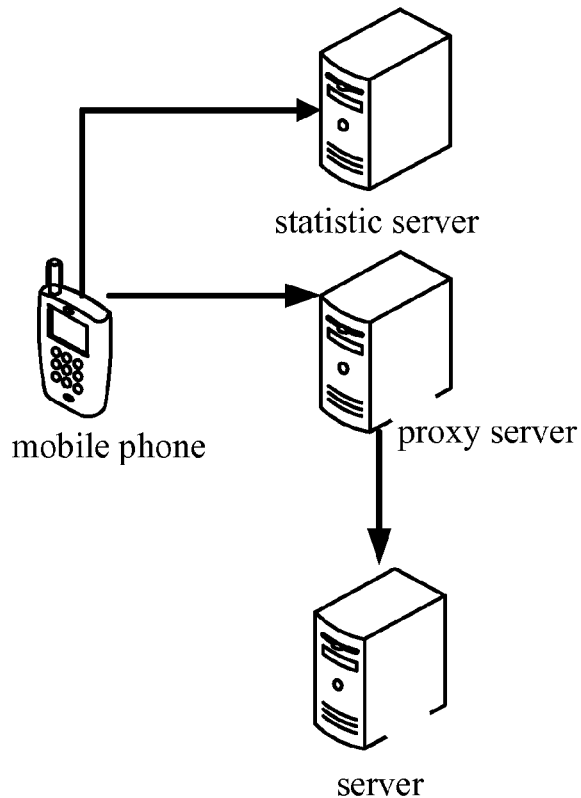
FIG. 3 is a schematic diagram illustrating a structure of a system which carries out the method for submitting data according to an example of the present disclosure.
Figure 4:
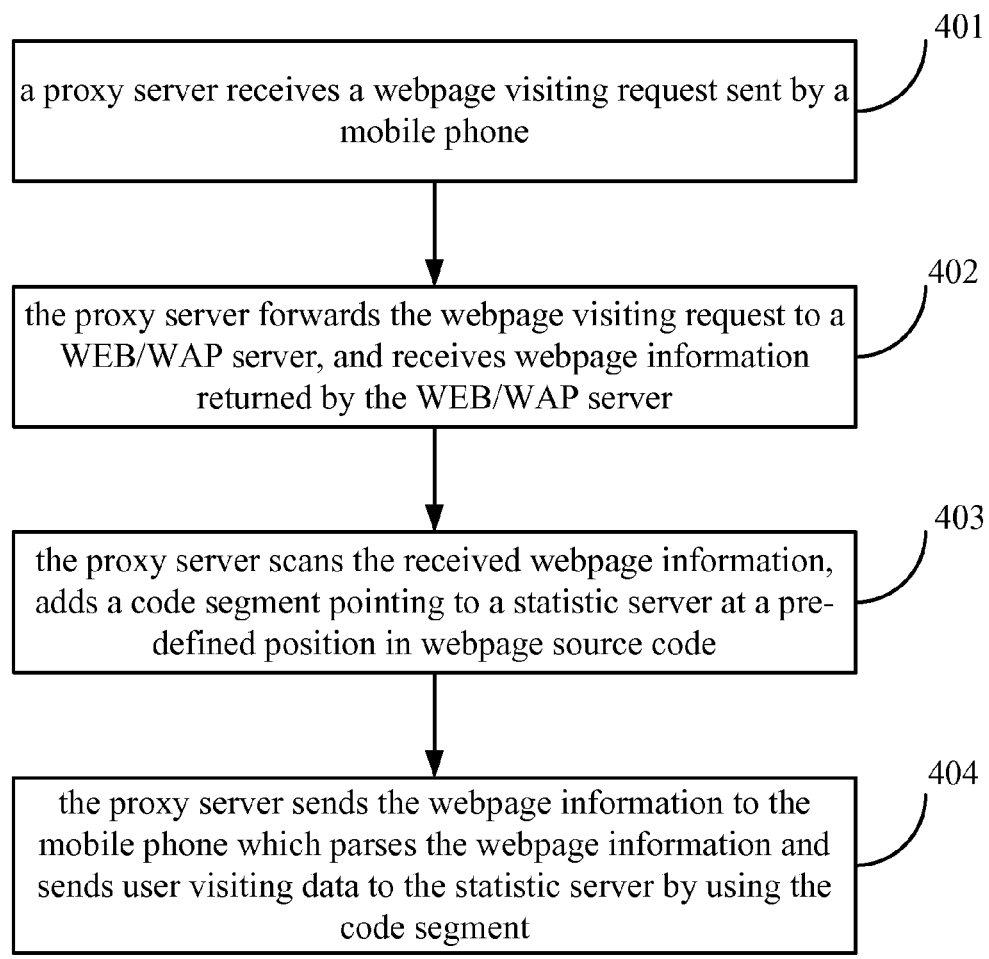
FIG. 4 is a flowchart illustrating a method for submitting data according to an example of the present disclosure.

The technical scheme of an example is applicable to the system as shown in FIG. 3. In this example, a browser in a mobile phone visits a webpage via a proxy server. FIG. 4 is a flowchart illustrating a method for submitting data according to an example of the present disclosure. The method may include the following procedures.

In block 401, a proxy server receives a webpage visiting request sent by a user terminal.

In an example, when a browser in a mobile phone visits a webpage via a proxy server and a user inputs an address of a webpage to be visited into an address bar in the browser, the mobile phone sends a webpage visiting request to the proxy server. The webpage visiting request includes information such as identity information of the mobile phone, IP address information of the mobile phone and the address of the webpage to be visited, and the like.

In block 402, the proxy server forwards the webpage visiting request received to a WEB/WAP server, and receives webpage information returned by the WEB/WAP server.

In an example, after receiving the webpage visiting request sent by the mobile phone, the proxy server forwards the webpage visiting request to the WEB/WAP server which searches for webpage information corresponding to the webpage address in the webpage visiting request and sends the webpage information to the proxy server.

In block 403, the proxy server scans the webpage information received, and adds a code segment pointing to a statistic server at a pre-defined position in source codes of the webpage.

This procedure is similar to that in block 202, and is not described further here.

In block 404, the proxy server sends the webpage information to the mobile phone which parses the webpage information and sends user visiting data to the statistic server according to the code segment.

Taking a code segment describing an image as an example of the code segment, in block 404, after receiving the webpage information sent by the proxy server, the mobile phone parses the webpage information; when parsing the image code segment, the mobile phone sends an image download request automatically to the statistic server according to address information of the statistic server in the image code segment; the statistic server obtains user visiting data in the image download request, e.g., identity information of the mobile phone, IP address information of the mobile phone, User-Agent and webpage address and the like, and performs statistics and analysis by using the user visiting data.

The proxy server in an example may be configured with information of a specific visiting object in advance. The configuration process is similar with the process of configuring information of a specific visiting object in a mobile phone which can directly visit a webpage, and thus is not described further here.

According to the method of various examples, when a mobile phone visits a webpage via a proxy server, the mobile phone is also enabled to report a user's visits to a webpage to the statistic server in real time to make the statistic server perform statistics and analysis by using the data obtained.

Figure 5:
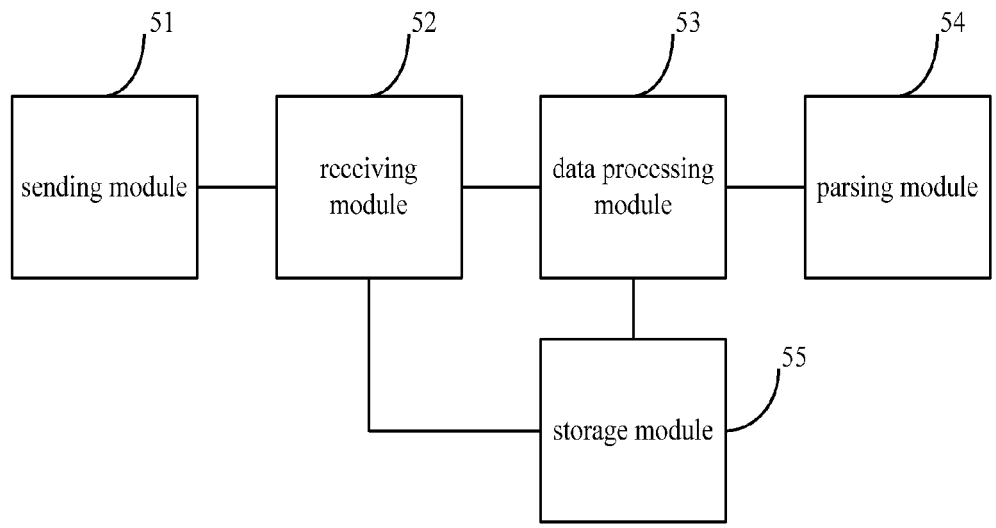
FIG. 5 is a schematic illustrating a structure of a user terminal according to an example of the present disclosure.
Figure 6:
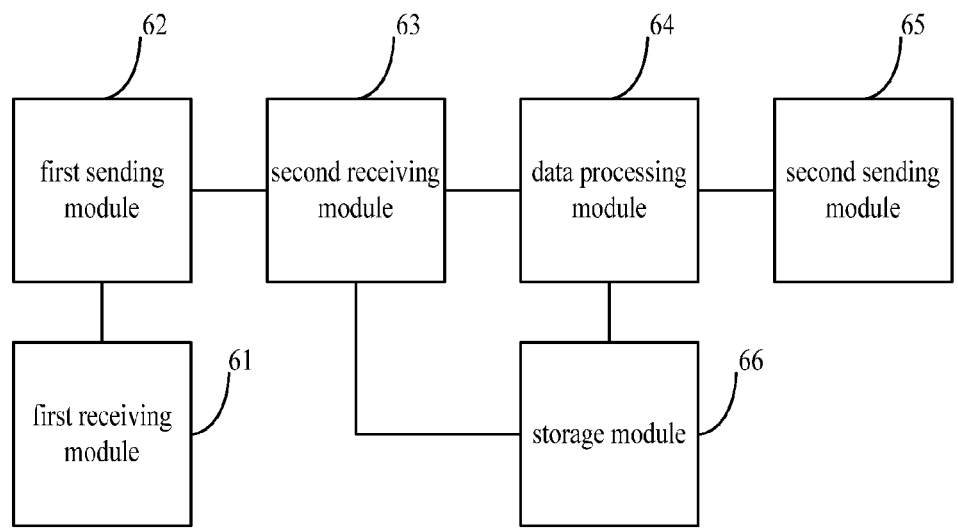
FIG. 6 is a schematic diagram illustrating a structure of a proxy server according to an example of the present disclosure.

Corresponding to the above method for submitting data, examples of the present disclosure provide a user terminal. As shown in FIG. 5, the user terminal may include:

a sending module 51, configured to send a webpage visiting request to a server;

a receiving module 52, configured to receive webpage information returned by the server in response to the webpage visiting request;

a data processing module 53, configured to scan the webpage information received by the receiving module 52, and add a mark which points to a statistic server into the webpage information; and a parsing module 54, configured to parse the webpage information, and send user visiting data to the statistic server based on the mark.

In an example, to implement targeted statistics and analysis and to reduce system workload, the user terminal may also include:

a storage module 55, configured to store information of a specific visiting object.

In this example, the data processing module 53 may be configured to scan the webpage information received by the receiving module 52 in response to a determination that an object being visited by the user terminal is the specific visiting object stored in the storage module 55, and add a mark pointing to the statistic server into the webpage information; or to make the parsing module 54 directly parse the webpage information received by the receiving module 52 in response to a determination that the object being visited by the user terminal is not the specific visiting object stored in the storage module 55.

According to an example, the method of adding at least one mark pointing to the statistic server in the webpage information may include: adding a mark pointing to the statistic server at a pre-defined position in the webpage source codes of the webpage information.

In an example, the mark may be a code segment which includes address information of the statistic server.

The code segment may be a code segment describing a resource file. The parse module may be configured to send a request for the resource file to the statistic server by using address information of the statistic server in the code segment describing the resource file; the request for the resource file may include user visiting data. The receiving module may be configured to receive a resource file response in which the resource file is null from the statistic server in response to the request for the resource file.

Taking an image code segment as an example of the code segment for a resource file, the parsing module 54 may obtain address information of the statistic server by parsing the image code segment pointing to the statistic server in the processed webpage information, and send an image download request to the statistic server automatically by using the address information of the statistic server. After receiving the image download request, the statistic server may return an image whose width and height are 0. The receiving module 52 may directly discard the received image when the width and the height of the image are 0.

Corresponding to the above method for submitting data, examples of the present disclosure also provide a proxy server. As shown in FIG. 7, the proxy server may include:

a first receiving module 61, configured to receive a webpage visiting request sent by a user terminal;

a first sending module 62, configured to forward the webpage visiting request received by the first receiving module 61 to a server;

a second receiving module 63, configured to receive webpage information returned by the server in response to the webpage visiting request;

a data processing module 64, configured to scan the webpage information received by the receiving module 63, and add a mark which points to a statistic server into the webpage information; and a second sending module 65, configured to send the webpage information to the user terminal which parses the webpage information and sends user visiting data to the statistic server by using the mark.

In an example, the proxy server may also include:

a storage module 66, configured to store information of a specific visiting object.

In this example, the data processing module 64 may be configured to scan the received webpage information in response to a determination that an object being visited by the user terminal is the specific visiting object stored in the storage module 66, and add a mark pointing to the statistic server into the webpage information; or to make the parsing module 65 directly parse the webpage information received by the receiving module 63 in response to a determination that the object being visited by the user terminal is not the specific visiting object stored in the storage module 66.

In an example, the mark may be a code segment which includes address information of the statistic server. The code segment may be a code segment describing a resource file.

According to an example, the method of adding at least one mark pointing to the statistic server in the webpage information may include: adding a mark pointing to the statistic server at a pre-defined position in the webpage source codes of the webpage information.

According to the technical scheme of various examples of the present disclosure, a user terminal is able to report a user's visits to a webpage to the statistic server in real time even when the user terminal visits the webpage via a proxy server.

Through the above description, those skilled in the art may understand that the embodiments of the present invention may be implemented by hardware or by a general-purpose hardware platform together with software. Thus, the technical scheme, or the portions making contributions to the conventional art may be embodied by a software product. The software product may be stored in a non-transitory storage medium, may include instructions to cause a computing machine (e.g., a PC, a server or a network device and the like) to execute the method of the various examples of the present disclosure.

Those skilled in the art should understand each of the drawings is merely a schematic of a preferred embodiment, and all the modules and the procedures in the drawings are not necessary for implementing the present invention.

Those skilled in the art can understand the modules in the apparatus of embodiments of the present invention may be located in the apparatus as described in the embodiments, or may be located in one or more apparatuses of the embodiments of the present invention when modified accordingly. The modules in embodiments of the present invention may be combined into one module, or may be further divided into multiple sub modules.

The index numbers of the embodiments are merely for facilitating description, and should not be interpreted to be representative for the preference order of the embodiments.

The foregoing is only some embodiments of the present invention. The protection scope of the present invention, however, is not limited to the above description. Any change or substitution that is within the scope disclosed by the present invention and can easily occur to those skilled in the art should be covered by the protection scope of the present invention.

The invention claimed is:

1. A method for submitting data, comprising,
   sending, by a user terminal, a webpage visiting request to a server;
   scanning, by the user terminal, webpage information returned by the server in response to the webpage visiting request, adding a mark pointing to a statistics server in the webpage information;
   parsing, by the user terminal, the webpage information, and sending user visiting data to the statistic server by using the mark;
   wherein the mark is a code segment including address information of the statistic server;
   wherein the code segment is a code segment describing a resource file;
   the step of sending user visiting data to the statistic server by using the mark comprises:
   sending, by the user terminal, a request for the resource file to the statistic server by using address information of the statistic server in the code segment describing the resource file, wherein the request comprises the user visiting data;
   receiving, by the user terminal, a response in which a resource file is null returned by the statistic server in response to the request for the resource file.

2. The method of claim 1, wherein the code segment is a code segment describing an image;

the response in which a resource file is null includes an image whose width and height are 0.

3. The method of claim 1, wherein the step of adding by the user terminal a mark pointing to the statistic server into the webpage information obtained comprises:

adding, by the user terminal, a mark pointing to the statistic server at a pre-defined position in webpage source code corresponding to the webpage information obtained.

4. The method of claim 3, wherein the code segment is added by the user terminal at the pre-defined position in the webpage source code when an objected being visited is a pre-defined specific visiting object.

5. The method of claim 1, wherein the user visiting data comprises at least one of:

identity information of the user terminal, address information of the user terminal, information of a user agent, address information of the webpage being visited by the user terminal.

6. A mobile terminal, comprising:

a sending module, configured to send a webpage visiting request to a server;

a receiving module, configured to receive webpage information returned by the server in response to the webpage visiting request;

a data processing module, configured to scan the webpage information received by the receiving module, and add a mark pointing to a statistic server in the webpage information; and a parsing module, configured to parse the webpage information, and send user visiting data to the statistic server based on the mark;

wherein the mark is a code segment including address information of the statistic server;

wherein the code segment is a code segment describing a resource file;

the parsing module is configured to send a request for the resource file to the statistic server by using address information of the statistic server in the code segment describing the resource file, wherein the request comprises the user visiting data;

the receiving module is configured to receive a response in which a resource file is null returned by the statistic server in response to the request for the resource file.

7. The user terminal of claim 6, wherein the code segment is a code segment describing an image;

the response in which a resource file is null includes an image whose width and height are 0.

8. The user terminal of claim 6, wherein the data processing module is configured to add a mark pointing to the statistic server at a pre-defined position in the webpage source code corresponding to the webpage information.

9. The user terminal of claim 8, further comprising:

a storage module, configured to store information of a specific visiting object; and the data processing module is configured to add a code segment pointing to the statistic server at the pre-defined position in the webpage source code when an object being visited by the user terminal is the specific visiting object stored in the storage module.

10. A method for submitting data, comprising, receiving, by a proxy server, a webpage visiting request sent by a user terminal;

forwarding, by the proxy server, the webpage visiting request to a server, receiving webpage information returned by the server in response to the webpage visiting request;

scanning, by the proxy server, the webpage information received, and adding a mark pointing to a statistic server into the webpage information;

sending, by the proxy server, the webpage information to the user terminal which parses the webpage information and sends user visiting data to the statistic server by using the mark;

wherein the proxy server adds the mark into the webpage information when an object being visited is a specific visiting object stored in advance.

11. A proxy server, comprising:

a first receiving module, configured to receive a webpage visiting request sent by a user terminal;

a first sending module, configured to forward the webpage visiting request received by the first receiving module to a server;

a second receiving module, configured to receive webpage information returned by the server in response to the webpage visiting request;

a data processing module, configured to scan the webpage information received by the second receiving module, and add a mark which points to a statistic server into the webpage information; and a second sending module, configured to send the webpage information to the user terminal which parses the webpage information and sends user visiting data to the statistic server by using the mark;

a storage module, configured to store information of a specific visiting object; and wherein the data processing module is configured to add the mark into the webpage information when an object being visited by the user terminal is the specific visiting object stored in the storage module.

* * * * *